Sept. 19, 1961 E. G. LILL 3,000,165
LAWN MOWER
Filed Dec. 24, 1957 2 Sheets-Sheet 1
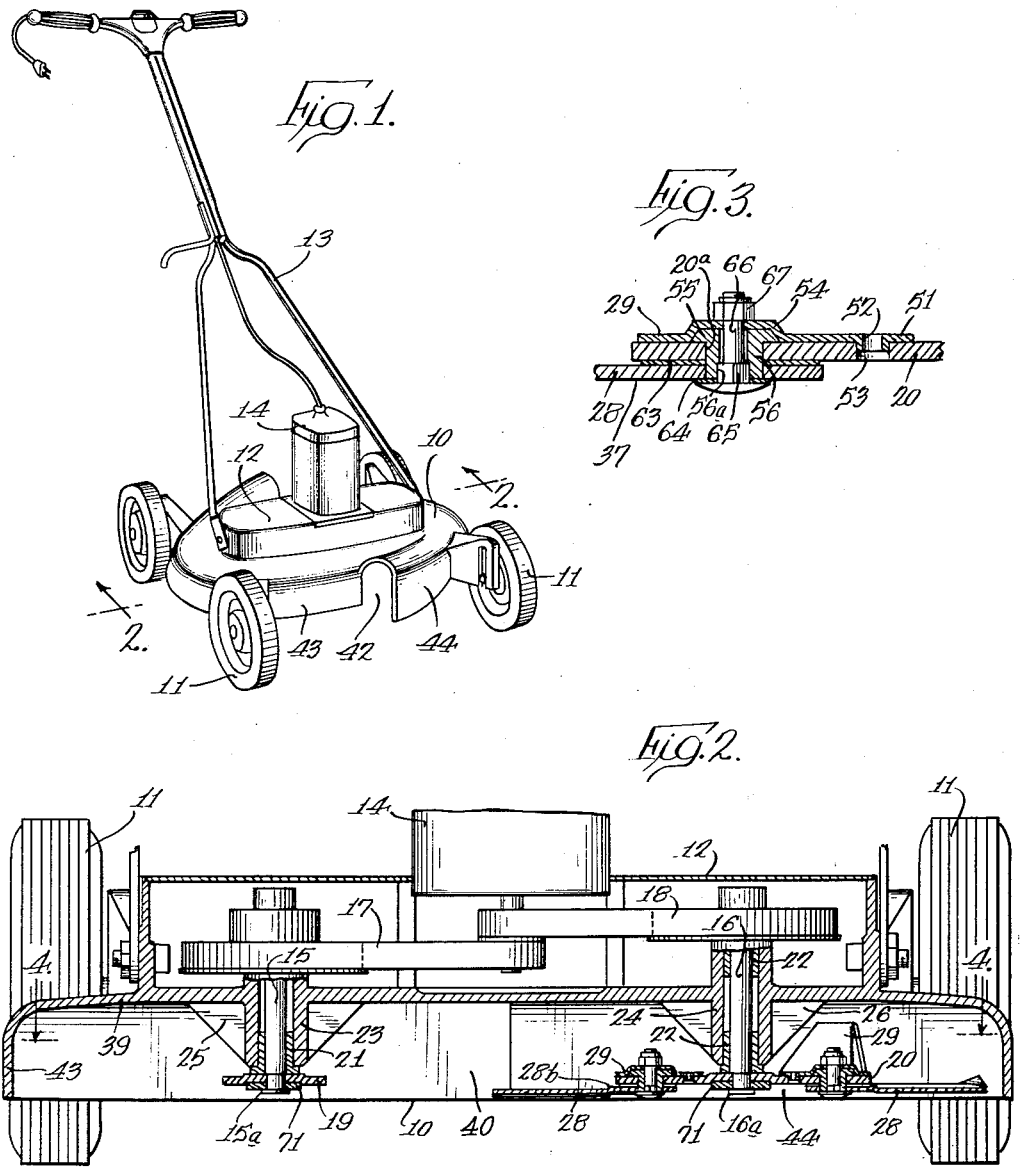
INVENTOR.
Etchison G. Lill
BY
George R. Clark
Atty.

Sept. 19, 1961  E. G. LILL  3,000,165
LAWN MOWER
Filed Dec. 24, 1957  2 Sheets-Sheet 2

INVENTOR.
Etchison G. Lill
BY
George R. Clark
Atty.

United States Patent Office
3,000,165
Patented Sept. 19, 1961

3,000,165
LAWN MOWER
Etchison G. Lill, Wheaton, Ill., assignor to Sunbeam Corporation, Chicago, Ill., a corporation of Illinois
Filed Dec. 24, 1957, Ser. No. 705,011
5 Claims. (Cl. 56—25.4)

This invention relates to a lawn mower, and more particularly to a lawn mower of the rotary type.

Lawn mowers of the rotary type are often provided with housings having walls depending down to a level slightly below the level of the blades of the mower for the purpose of restricting the travel of objects thrown by the rapidly rotating blades. Such housings are often in the form of an inverted cup with the flange or rim of the cup extending slightly below the level of the rotating blade or blades of the mower. These housings effectively prevent injuries to the user of the mower from objects such as stones, sticks and the like which are sometimes encountered by the blades of the mower and are thrown by the blades.

Although the housing has become recognized as a necessity for a rotary mower because of the safety functions it performs, there are aspects wherein the housing interferes with the operation of the mower under certain conditions. The housings tend to retain the grass clippings in the paths of the blades so that the clippings are chopped into very fine particles before they are discharged. This feature is desirable since the finely cut grass may be left on the lawn without harming it. When the grass being mowed is wet, however, the clippings tend to stick to and cake up on the top and sides of the housing. As the grass builds up, it becomes compacted into a very solid mass which restricts the rotation of the blades as well as interfering with the mowing action of the blades. Much of the grass drops in clumps on the lawn as the built-up cakes of wet grass are dislodged from the housing. It would be desirable in such mowers to provide structure for preventing such caking and clogging. It also would be desirable to provide such a mower with a strong lifting effect on the grass. Another desirable feature in a rotary mower would be the provision of a high throwing or grass-discharging power for the blades thereof.

It is accordingly an object of the invention to provide a new and improved rotary mower.

Another object of the invention is to provide a rotary mower substantially free of caking and clogging of grass clippings in the housing when the mower is used to mow wet grass.

Still another object of the invention is to provide a rotary mower having high lifting power of the rotary blades.

A further object of the invention is to provide a rotary mower with improved throwing power of the blades.

Yet another object of the invention is to provide a rotary mower having blades in which the outer rear corner portions are tilted to prevent caking of wet grass on portions of the housing above the outer ends of the blades and tilted vanes located near the inner ends of the blades to direct air at a high velocity against the portions of the top of the housing over the inner ends of the blades.

Another object of the invention is to provide a rotary mower in which a blade mounting plate rotated by a prime mover has pivotal blades on the outer ends of the plate along with vanes secured together as an assembly by a single bolt. The vanes may be provided with key portions drawn therefrom designed to enter holes in the blade mounting plate to hold the vanes against movement relative to the plate, and the vanes may be mounted on top of the blade mounting plate with the blades mounted on the bottom of the blade mounting plate.

A still further object of the invention is to provide vane attachments for a rotary mower which may be secured to a blade mounting plate of the mower by a bolt securing a blade to the mower. Each vane may be provided with a base portion secured to the upper face of the blade mounting plate together with a tilted back portion designed to force air upwardly against the housing of the mower along with a forwardly directed portion at the side which reduces radial flow of the air from the vane. The vane forces the air upwardly against the top of the housing and the air flows outwardly to discharge spouts formed in the housing to keep the housing cleared of grass and prevent caking of grass on top of the housing.

Other objects of the invention will become apparent from the following detailed description of a rotary mower forming a specific embodiment of the invention, when read in conjunction with the appended drawings, in which:

FIG. 1 is a perspective view of a rotary mower forming one embodiment of the invention;

FIG. 2 is an enlarged, fragmentary, vertical sectional view of the mower taken along line 2—2 of FIG. 1;

FIG. 3 is an enlarged vertical section illustrating the assembly of the rotary cutting blades and wind vanes of the mower together with a blade mounting plate;

Figure 4:
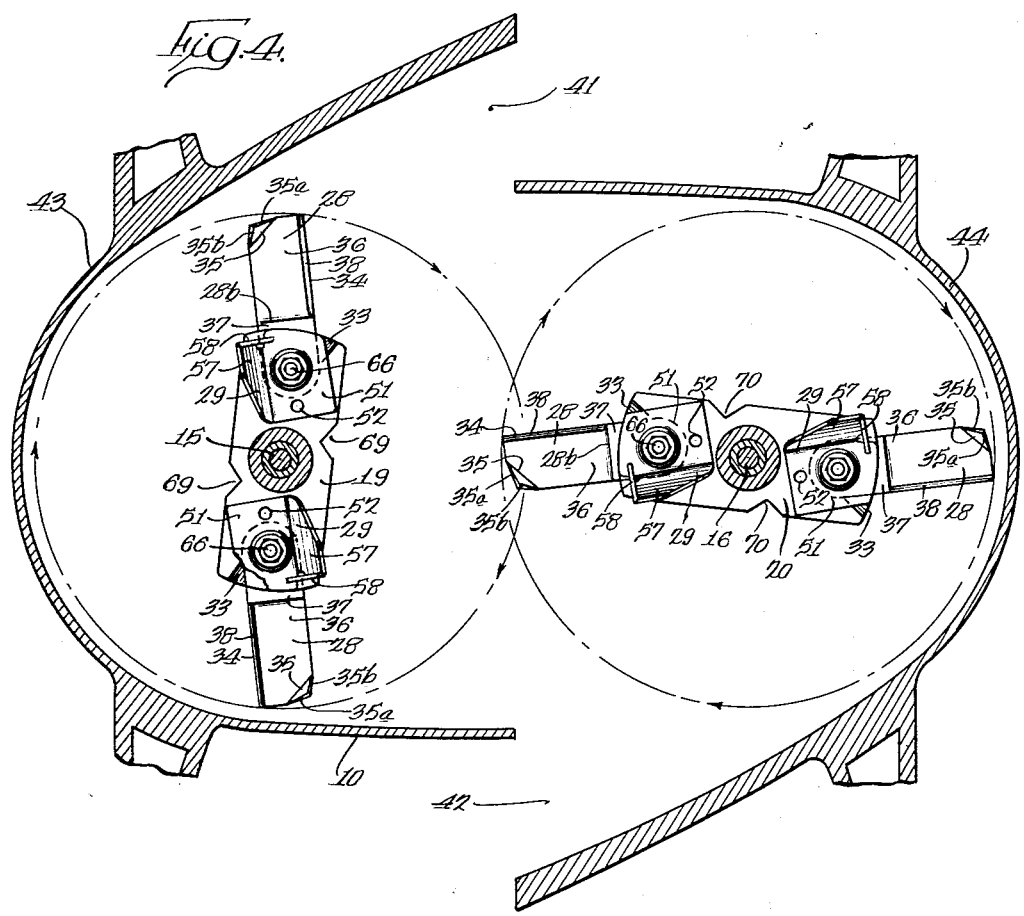
FIG. 4 is a horizontal sectional view taken along line 4—4 of FIG. 2.
Figure 5:
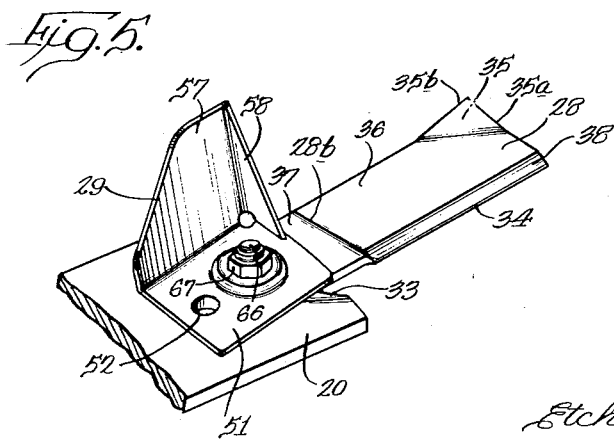
FIG. 5 is a fragmentary perspective view of the vane and blade structure of the mower.

The invention provides a rotary mower having a housing and a blade structure revolving in the housing below the top thereof. The blade structure serves to cut grass and also directs air against the top of the housing so as to dislodge any grass tending to stick to the top of the housing. The blade structure may include one or more rotatably mounted plates having cutting blades mounted pivotally near the periphery thereof and extending outwardly therefrom. The blades are pivotally mounted so that they may be deflected out of the normal cutting path when a solid object such as a stone, stake or the like is encountered. The blades have upwardly tilted outer rear corner portions to force air primarily upwardly against the top of the housing over the path of the outer ends of the blades to keep the grass swept off of that portion of the housing. This updraft created by the blades also tends to maintain the grass in an erect position for cutting. The blade structure may include vanes mounted on the top of the blade mounting plate having tilted back portions secured to bases lying against the upper face of the blade mounting plate. The vanes may also include at the outer ends of the tilted back portions, forwardly projecting wings. The vanes are provided to limit the radial flow of air and to maintain the flow of air upwardly against the top of the housing to keep the housing swept clear of clippings. The blades may be mounted rotatably on bushings projecting through the mounting plate. A single bolt projecting through each bushing holds the blades to the bushing and locks the vanes to the blade mounting plate.

Referring more specifically to the drawings, there is shown therein a rotary mower of the twin blade type which includes a generally cup-shaped housing 10 mounted on wheels 11 and supporting a gear housing portion 12 to which is secured a handle 13. The construction of the lawn mower with the exception of the blade structure is disclosed and claimed in the copending United States Patent application Serial No. 574,489, now U.S. Patent No. 2,926,478 filed March 28, 1956, by Ivar Jepson and assigned to the same assignee as the instant application. The handle may be swung from one side of the mower to the opposite side to permit the mower to be pushed in either direction. Also carried by the housing 10 is an electric motor 14 which drives shafts 15 and 16 by means of belts 17 and 18, respectively. The belts 17 and 18 are of a type which is commonly used for timing purposes and keep the shafts 15 and 16 synchronized relative to one another so that rotors or blade mounting plates 19 and 20 keyed to the shafts are always at 90 degrees relative to one another. The 90 degree orientation of the plates is necessary to prevent interengagement of the blades mounted on adjacent plates. The two sets of blades describe overlapping patterns to assure a smooth cut across the width of the mower. The shafts 15 and 16 are mounted in bushings 21 and 22 pressed into bearings 23 and 24 which are cast integrally with the housing 10. The bearings 23 and 24 are reinforced by webs 25 and 26, respectively.

The plates 19 and 20 are keyed to the shafts 15 and 16 by irregularly shaped shaft ends and complementary holes in the plates as is described in detail in the above-cited Jepson patent. To retain the plates 19 and 20 on the shaped ends of shafts 15 and 16, the ends of the shafts are provided with deformed or headed over portions 15a and 16a. The headed over portions 15a and 16a engage retaining washers 71 which abut the bottoms of the plates 19 and 20 and prevent downward movement thereof. The shafts 15 and 16, the plates 19 and 20 and the retaining washers 71 are brazed together to assure a secure assembly of the parts.

Pivotally mounted on the lower side and at the outer ends of the plates 19 and 20 are blades 28. Each of the blades 28 has a knife like cutting edge 34 formed on its leading edge to cut the grass as the blades rotate with the plates 19 and 20. The blades 28 are moved by centrifugal action toward radial positions relative to the shafts 15 and 16 when the mounting plates 19 and 20 are rotated by the shafts 15 and 16. To limit the movement of the blades 28, stops 33 are formed on the plates 19 and 20 by slitting the ends of the plates 19 and 20 and pressing the stops 33 downwardly out of the plane of the plates 19 and 20. In order to provide the best cutting action of the blades, the stops locate the blades at angular positions in which the cutting edges 34 formed on the blades 28 extend rearwardly at an angle to a radial line through the axis of shafts 15 and 16. This rearward inclination of the blades, as illustrated by the positions of the blades as shown in FIG. 4, causes a slicing action of the blades 28 on the grass or other material to be mowed.

This location of the blades 28 relative to the plates 19 and 20 is also designed to reduce wear in the pivotal connection between the blades and the plates. The centrifugal force acting on the blades 28 tends to move them to radial positions relative to the axes of shafts 15 and 16. Since the stops 33 prevent the blades assuming the radial position, the centrifugal force maintains each blade in a fixed position against one of the stops 33 under normal running conditions. If it were not for the stops 33, the blades would tend to oscillate slightly about their radially extending positions. This slight oscillation would result in excessive blade wear at the pivotal mounting of each blade. The blade stops 33 against which the blades are forced by centrifugal force prevent any such oscillation.

To create an updraft which is regarded as necessary for the proper functioning of a rotary lawn mower, the blades 28 are formed so that they act in a manner similar to a fan as they rotate about the axes of shafts 15 and 16. To produce this fan-like action, each of the blades 28 is provided with an upwardly tilted corner portion 35 forming approximately a forty-five degree angle with the main portion of the blade 28. Edges 35a and 35b of the corner portions are substantially equal in length, and the length of each edge 35a is slightly greater than one-half the width of the blade 28. In order to add to the fan action created by the tilted corner portions 35, each blade has a downwardly sloped main portion 36 formed by twisting the blade along a line 28b. Each of the blades 28 is supported in bearing engagement with the bottom of plate 19 or 20 by a horizontal mounting portion 37 which joins with the main portion 36 of the blade 28 along the line 28b. Thus, the mounting portion 37 is positioned substantially horizontally with the main portion 36 being angled downwardly to scoop up the air and create an updraft of air as the plates 19 and 20 revolve on shafts 15 and 16. This updraft created by the main portion 36 and the tilted corners 35 tends to raise the uncut grass to a vertical position where it may be easily and neatly cut.

Each of the cutting edges 34 is formed by grinding or beveling a flat 38 forming an angle of about twenty degrees relative to the main portion 36 of the blade 28. The downward angle of the flat 38 tends to increase the updraft created by the blades 28. The strong updraft created by the geometry of the blades not only aids in positioning the uncut grass for cutting but also prevents the cut grass from interfering with the blades or collecting in the housing. There is a tendency for the cut grass to remain in the vicinity of the cutting blades or to collect on the inside of the housing 10. As can be seen in FIG. 2, the housing 10 has a generally horizontally extending top or roof 39 which defines the upper limit of the chamber 40 in which the grass is cut. The strong currents of air developed by the rotation of the blades 28 tend to keep the bottom surface of the top 39 clear of grass clippings. This is particularly true in the area immediately above the corner portions 35 where the updraft of air is particularly strong.

To discharge the cut grass from the housing 10, a pair of discharge openings 41 and 42 are formed in the downwardly depending side walls 43 and 44 which define in part the housing 10. The discharge openings 41 and 42 extend tangentially to the blade patterns and function in the manner described in the above cited copending Jepson application. Thus, the blades positioned on mounting plate 19 discharge grass clippings through the opening 41 and the blades mounted on plate 20 discharge the clippings through opening 42. A projection of the plane defined by the corner 35 onto a radial plane through the axis of shafts 15 or 16 would show that a substantial portion of the upturned corners 35 on the blades 28 is effectively positioned radially of the shafts 15 and 16. Because of this positioning of the corners 35, there is a tendency for the corners 35 to rotate the air mass along with the blades and create tangential forces tending to rotate the clippings with the blades and throw them outwardly from the discharge openings. The mode of operation can be compared to a centrifugal pump in which the fluid mass is moved so rapidly by blade members that the fluid moves outwardly under centrifugal force drawing more fluid axially into the area of the blades.

To supplement the action of the blades 28 in creating air turbulence in the housing and in moving the clipped grass, a vane member 29 is mounted on the upper surface of each blade carrying plate immediately above the mounting portion 37 of each of the blades 28. Each vane 29 is mounted against the upper face of the plate 19 or 20 by a mounting portion 51. To permit assembly of the vanes 29 to the mounting plates, the mounting portions 51 are formed with perforated and drawn bosses 52. The bosses 52 are designed to fit into holes 53 in the mounting plate to key the vanes 29 against rotation relative to their respective mounting plates. To pivotally support the blades 28 on the mounting plates 19 and 20, shouldered bushings 56 are utilized which extend downwardly through holes 20a formed in the mounting plates. The shoulder or head portion 55 of each bushing 56 is seated against the upper face of one of the mounting plates. To provide clearance for the shoulder portion 55 of the bushing 56, each of the vanes has a drawn recessed portion 54.

In order to provide strong upward blasts of air directed against the portions of the housing directly over the outer ends of the plates 19 and 20 and the inner ends of the blades 28, the vanes 29 are provided with rearwardly and upwardly tilted upstanding vane portions 57 and forwardly directed wings or side portions 58. To clear the webs 25 and 26 as the vanes are rotated about shafts 15 and 16, the vanes are relieved at the inner corners of the vane portions 57. The vane portions 57 force streams of air upwardly against the bottom face of the top of the housing 10 to sweep or drive away any clippings of the grass that might tend to stick to those portions of the housing. Since the vanes are being revolved with the plates 19 and 20, there tends to be substantial radial components in the flow of air therefrom. To restrict such flow and minimize the radial flow of air from the vanes 29, the wings 58 are directed forwardly relative to the directions of rotation of the vanes 29. The wings restrict the radial or centrifugal flow of air and keep the main flow of air upwardly toward the bottom face of the housing. The wings 58 are substantially tangent to circles having their centers on the axes of shafts 15 and 16. Through such an arrangement the radial flow inhibiting action of the wings 58 is maximum. The upper edges of the vane portions 57 are spaced closely to the top of the housing so that the air flow is very rapid at it strikes the top of the housing.

In one commercial embodiment of the invention, the top edges of the vanes were about three-eighths of an inch from the bottom face of the housing and the angle between the vane portions 57 and the mounting portions 51 was about one-hundred seven and one-half degrees. The line defined by intersection of the mounting portion 51 and the vane portion 57 was along a radially extending line through the axis of shaft 15 or 16 and at an angle of about twenty-four degrees relative to the center line of the mounting plate 19 or 20 on which it was mounted. The cutting edges 34 of the generally rectangularly shaped blades 28 when in their mowing positions against the stops 33 formed angles of about sixteen degrees with the center lines of the respective plates 19 and 20. The blades 28 were formed from sheet metal shaped to the shape shown.

The blades 28 are mounted rotatably on the lower ends of the bushings 56 between leaf spring washers 63 and wear resistant washers 64. The washers 64 are provided with square holes therein into which square locking portions 65 of bolts 66 extend. The bolts 66 are restrained against rotation relative to bushings 56 by the engagement of the square portion 65 of bolt 66 into square socket portions 56a formed in the lower ends of the bushing 56. The bushings 56 are copper brazed to the plates 19 and 20 along their engaging surfaces beneath the shoulder portions 55 of the bushings and around the inner diameter of holes 19a and 20a thereby preventing rotation of both the bushings and the bolts 66 relative to the plates. To hold the mounting portions 51 of the vanes 29 secured against the blade mounting plates 19 and 20, lock nuts 67 are threaded on the upper ends of the bolts 66 and press the mounting portions of the vanes against the plates 19 and 20. The washers 64 bear against the lower ends of the bushings 56 and the spring washers 63 urge the blades 28 firmly against washers 64 to prevent rattling of the blades 28. The blades 28 are free to pivot on the bushings 56 between mowing positions in which the blades abut the stops 33 (FIG. 4) and retracted positions in which the blades 28 engage the retaining washers 71. The washers 71 provide rugged wear resistant stops which can stand up under the sudden impact often delivered when the blades strike an object and swing to their retracted positions. To permit clearance so that the upturned corner portions 35 do not engage the bottoms of plates 19 and 20 before the blades strike retaining washers 71, clearance notches 69 and 70 are formed in plates 19 and 20, respectively. The notches 69 and 70 permit the blades 28 to move back to their retracted positions without contact between the turned up corners 35 and the plates 19 and 20.

From the foregoing description, it is apparent that the blade structure of the mower creates strong flow of air upwardly against the top of the housing 10 to effectively sweep the top of the housing clear of clippings. This combined action of the vanes and blades prevents the formation of clumps of clippings, and keeps the housing well cleared. The structure of the vanes is simple, easily fabricated and rugged. The fastening means mounting the blades on the rotors also serves to retain the vanes thereon so that the fastening means for these elements is a minimum.

While there has been illustrated and described a particular embodiment of the present invention, it will be appreciated that numerous changes and modifications are likely to occur to those skilled in the art, and it is intended in the appended claims to cover all those changes and modifications as fall within the true spirit and scope of the present invention.

What is claimed as new and desired to be secured by Letters Patent of the United States is:

1. In a rotary mower, a housing having a top wall, a shaft depending downwardly from said top wall, a cutting means rotated by said shaft, sheet metal vanes having mounting portions secured to said cutting means and also including vane portions extending upwardly from said cutting means and backwardly relative to the direction of rotation of said cutting means the upper edge of said vane portions being adjacent said top wall, said vane portions positioned adjacent said shaft and extending radially from said shaft, said vane portions being provided with flange portions at the outer edges thereof, and said flange portions extending from said vane portions forwardly relative to the direction of rotation of said cutting means.

2. In a rotary mower, a housing having a top wall and also being provided with bearing means depending downwardly from said top wall, a rotatable shaft extending through said bearing means, a blade mounting member fixed to the lower end of said shaft, blades mounted on said member, sheet metal vanes having portions extending upwardly from said member to a point close to said top wall and backwardly relative to the direction of rotation of said member, said portions also extending outwardly on said member from a point close to said depending bearing member, said vanes also being provided with flange portions at the outer edges thereof, and said flange portions extending from said vane portions forwardly relative to the direction of rotation of said member.

3. In a rotary mower, a housing having a top wall and defining two side-by-side chambers, bearing means positioned in said housing and extending from said top wall into said chambers, reinforcing web portions connecting said bearing means to said top wall, a pair of shafts rotatably supported in said bearing means, a pair of blade mounting plates secured to the lower ends of said shafts, cutting blades secured to the ends of said plates and provided with upwardly turned rear outer corner portions and having the leading edges of said blades sharpened from their outer ends inwardly toward said plates to form cutting edges, and vanes secured to said plates inwardly of said cutting portions in positions in which said vanes are rotated closely to said webs and said top wall of said housing to prevent further accumulations of clippings said vanes extending radially of their supporting shafts and being inclined upwardly to create an updraft of air to maintain the lower side of said top wall free of cut grass.

4. A rotary lawn mower comprising an inverted cup-shaped housing forming a cutting chamber, a vertically disposed shaft supported for rotation on said housing, radially extending cutting blades secured to the lower end of said shaft for rotation in a horizontal plane in said chamber, said cutting blades having their leading edges sharpened from their outer end inwardly to form cutting edges, vane means secured to the lower end of said shaft for rotation therewith in said chamber, said vane means extending radially of said shaft and being inclined rearwardly of the direction of rotation to create an updraft of air, said vane means being positioned close to said shaft and radially inwardly of said cutting edges whereby said updraft of air moves outwardly across the top of said cutting chamber to prevent accumulation of grass clippings therein.

5. A rotary lawn mower comprising an inverted cup-shaped housing forming a cutting chamber, a vertically disposed shaft supported for rotation on said housing, cutting blades having their leading edges sharpened to form cutting edges, means supporting said blades within said housing for rotation on the lower end of said shaft, said blades extending radially of said shaft, vanes carried by said blade supporting means and positioned radially inwardly of said cutting edges, each vane including a horizontal base portion secured to said blade supporting means, said base portion having a trailing edge extending radially of said shaft, a vane portion integral with said trailing edge and extending upwardly and backwardly from said base portion, and a flange portion integral with the outer edge of said vane portion and extending forwardly with respect to the direction of rotation of said shaft.

References Cited in the file of this patent

UNITED STATES PATENTS

| | | |
|---|---|---|
| 2,115,265 | Jennett | Apr. 26, 1938 |
| 2,203,198 | Junge | June 4, 1940 |
| 2,578,880 | Doyle | Dec. 18, 1951 |
| 2,654,986 | Gold | Oct. 13, 1953 |
| 2,669,084 | Warren | Feb. 16, 1954 |
| 2,697,323 | Horn | Dec. 21, 1954 |
| 2,720,070 | Arrington | Oct. 11, 1955 |
| 2,720,071 | Watanabe | Oct. 11, 1955 |
| 2,734,327 | Whitney | Feb. 14, 1956 |
| 2,763,116 | Flinchbaugh et al. | Sept. 18, 1956 |
| 2,764,865 | Pollard | Oct. 2, 1956 |
| 2,787,108 | Meltzer | Apr. 2, 1957 |
| 2,807,126 | Bennett | Sept. 24, 1957 |
| 2,815,634 | Bush | Dec. 10, 1957 |
| 2,836,021 | Wood et al. | May 27, 1958 |
| 2,836,029 | Johnson | May 27, 1958 |